Jan. 10, 1928.

W. C. CARPENTER

FUEL BRIQUETTE MACHINE

Filed March 18, 1926

Inventor:—
Wm. C. Carpenter.
By Martin P. Smith, Atty.

Jan. 10, 1928.
W. C. CARPENTER
FUEL BRIQUETTE MACHINE
Filed March 18, 1926
1,655,535
3 Sheets-Sheet 2
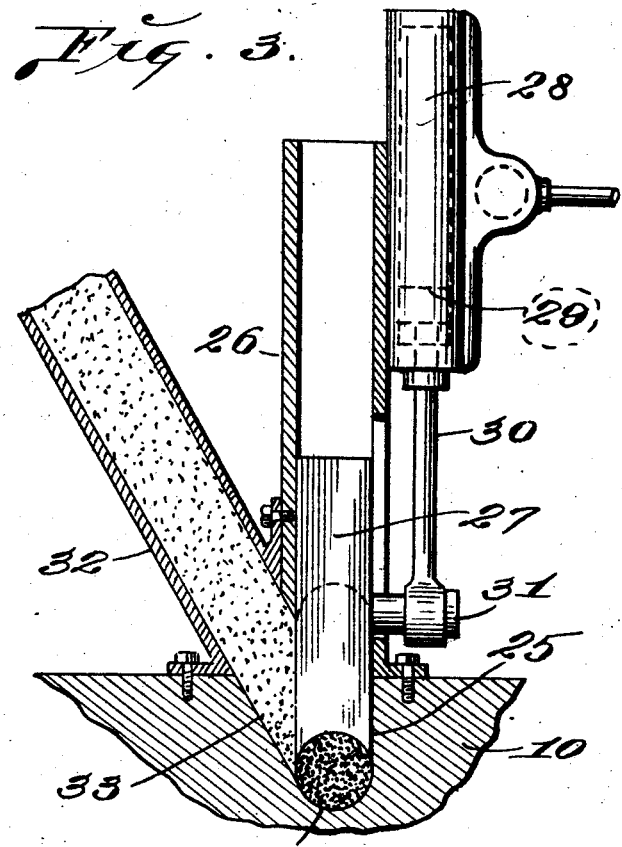
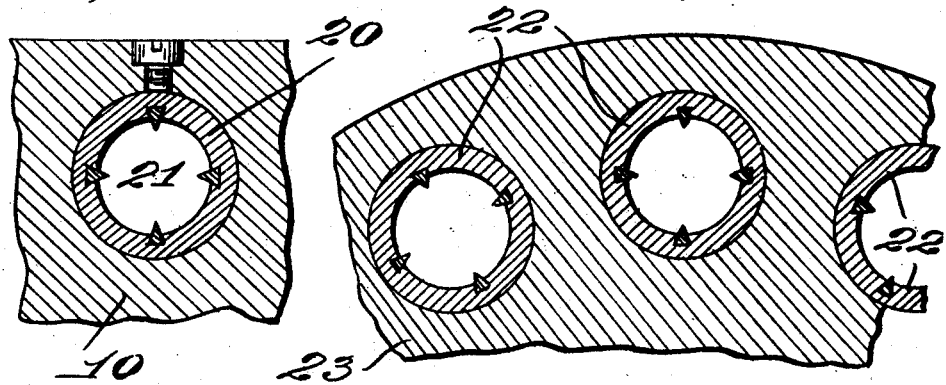
Inventor:—
Wm. C. Carpenter.
By Martin P. Switz atty.

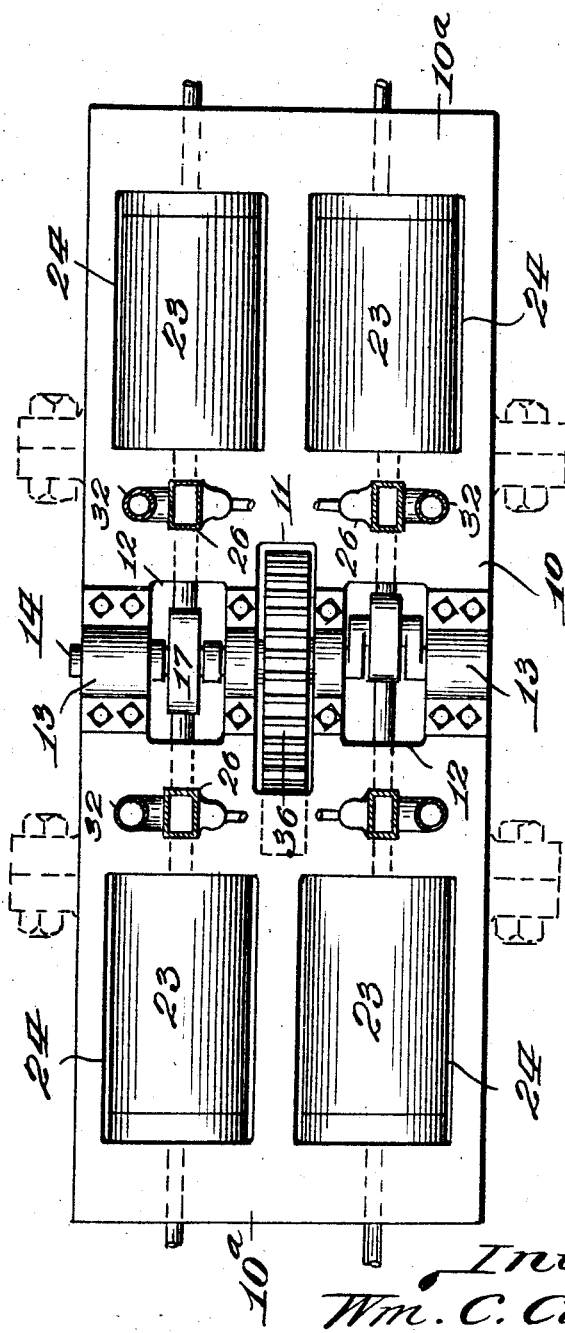

Patented Jan. 10, 1928.

1,655,535

UNITED STATES PATENT OFFICE.

WILLIAM C. CARPENTER, OF SAN FRANCISCO, CALIFORNIA.

FUEL-BRIQUETTE MACHINE.

Application filed March 18, 1926. Serial No. 95,623.

My invention relates to an apparatus for producing fuel briquettes from sawdust, wood shavings and the like, and has for its principal objects, the provision of a relatively simple, practical, strong and durable apparatus that may be economically operated, and which will, within a given period of time, produce a relatively large tonnage or output of briquettes.

Further objects of my invention are, to provide a machine of the character referred to, with a plurality of reciprocating plungers that compress charges of briquetting material into dies or briquette-forming members; to provide simple and efficient means whereby all of the plungers are actuated from a single crank shaft; to provide means for delivering uniform charges of briquette material into the feeding chambers traversed by the plungers; and further, to mount the operating parts of the machine upon a strong and substantial frame so that the latter will withstand the strains and stresses developed during the operation of the machine.

With the foregoing and other objects in view, my invention consists in certain novel features of construction and arrangement of parts that will be hereinafter more fully described and claimed and illustrated in the accompanying drawings in which:

Fig. 3 is an enlarged cross section taken on the line 3—3 of Fig. 1.

Fig. 4 is an enlarged cross section taken on the line 4—4 of Fig. 1.

Fig. 5 is an enlarged cross section taken on the line 5—5 of Fig. 1.

Fig. 6 is a plan view of my improved briquette machine wherein portions of the frame extend around the rotary dies.

Figure 1:
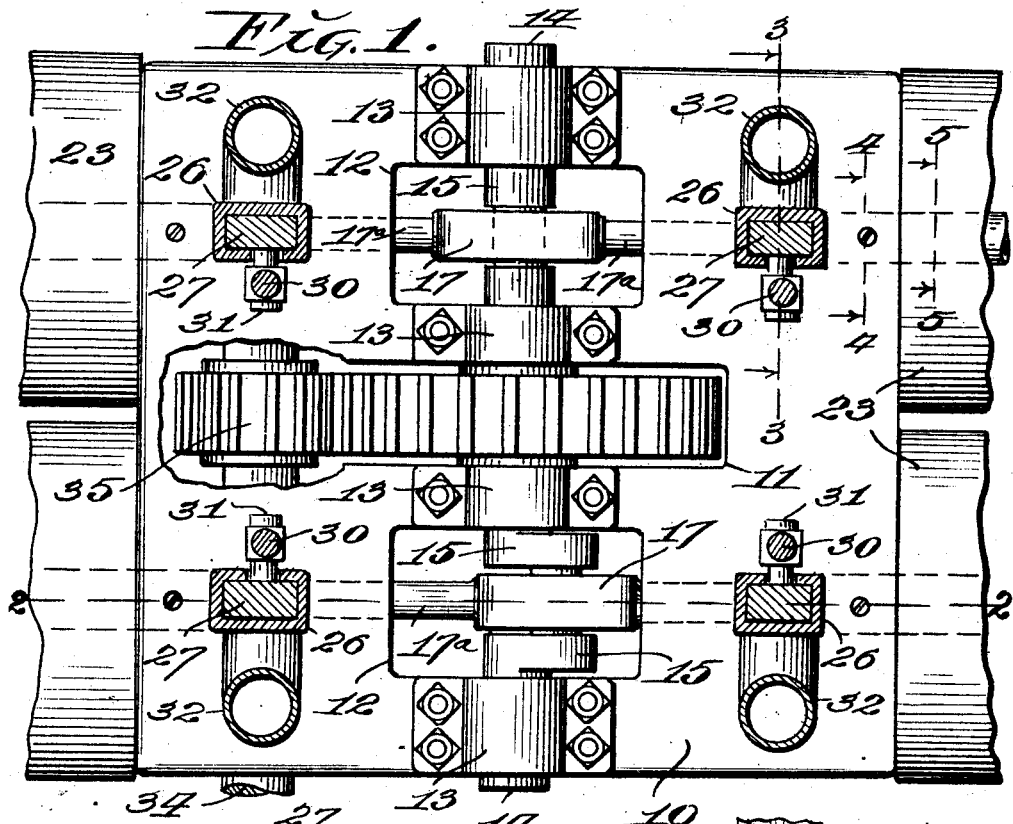
Fig. 1 is a top plan view of a briquette machine embodying the principles of my invention.

Referring by numerals to the accompanying drawings which illustrate a practical embodiment of my invention, 10 designates the frame of the machine, which is approximately rectangular in form, and preferably formed of metal, either cast integral or fabricated.

Formed in the central portion of this frame, is a longitudinal opening 11, and formed in the frame to the sides of said central opening are openings 12. Arranged on the frame between these openings, and between the openings 12 and the sides of the frame, are bearings 13 for a crank shaft 14, the same being provided with two cranks 15, one crank being located in each opening 12, and said cranks being disposed approximately 90° apart.

Journalled on each crank 15 is a cross head 16 that is mounted for sliding movement in a vertically disposed yoke 17, and projecting from the sides of said yoke, are aligned studs or short shafts 17$^a$ to which are detachably connected plungers 18.

Plungers 18 are arranged to reciprocate through horizontally disposed material feeding chambers 19, that are formed in frame 10, and removably seated in the outer portion of each feeding chamber is a briquette-forming die 20 that is tubular in form and provided on its inner face with a plurality of longitudinally disposed ribs 21.

For a more complete description of the briquette-forming dies used in my improved press reference may be had to my co-pending application for patent filed November 23, 1925, Serial Number 70,869.

Disposed in alignment with each die 20 is a tubular member 22, that receives the formed briquette as it is ejected from the forming die, and which tubular member 22 functions as a holder for a plurality of the briquettes while the same are being baked or subjected to sufficient heat to char the material from which they are formed. I prefer to mount a series of these tubular holders 22 in a substantially cylindrical frame or holder 23 and to arrange the same so that it is intermittently rotated, thereby bringing the tubular holders into successive registration with the dies and which provision and arrangement is fully set forth in my aforesaid co-pending application.

Figure 2:
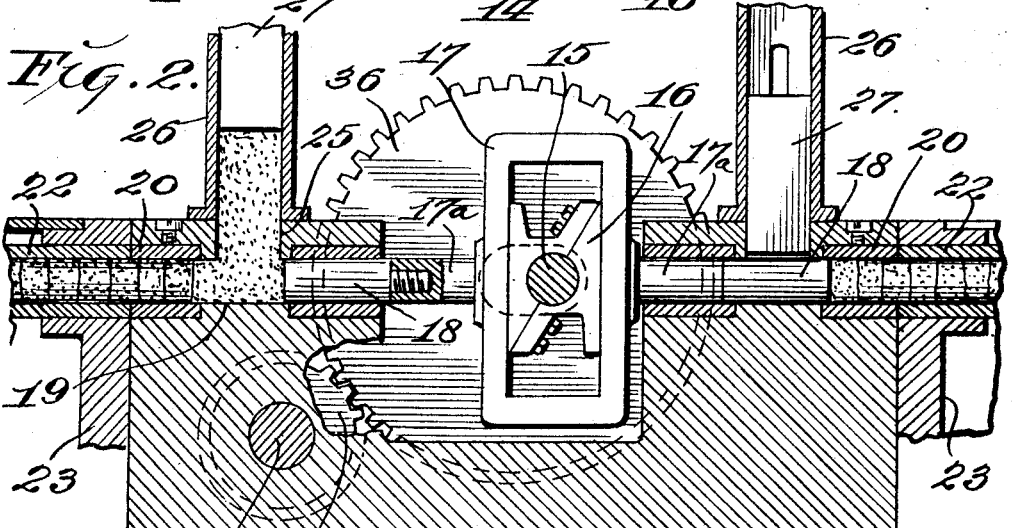
Fig. 2 is a vertical longitudinal section taken on the line 2—2 of Fig. 1.

In Figs. 1 and 2 I have shown the rotary frame or holder 23, positioned directly against the ends of frame 10, whereas in Fig. 6 I have shown said rotary members in openings 24 that are formed in the extended end portions 10a of the main frame. This latter construction of the frame produces sufficient strength and weight to withstand the relatively high strains and stresses produced in the machine while the plungers are compressing the material into briquettes within the forming dies 20.

The extended portions 10a of the main frame may be formed integral with said main frame as illustrated by solid lines in Fig. 6, or they may be separately formed and detachably secured thereto as illustrated by dotted lines in said figure.

Formed in frame 10 and leading from the upper surface thereof, downwardly into each material feeding chamber 19, just behind each forming die 20 is a material inlet opening 25, and secured to the top of the frame above said inlet opening is a vertically disposed guide 26 for a material feeding plunger 27.

This feeding plunger may be reciprocated vertically in any suitable manner, but I prefer to arrange on the side of the guide 26, a fluid pressure cylinder 28 within which operates a piston 29 and the latter being connected by means of a piston rod 30 and wrist pin 31 to plunger 27.

An inclined material feeding chute 32 leads to an inclined portion 33 of the inlet opening 25 and which inclined portion 33 is formed in the top of the machine body 10 immediately to the side of the lower end of plunger guide 26.

Journalled in the lower portion of the frame 10 is a transversely disposed shaft 34 that may be driven by a motor or from an engine and mounted on said shaft is a pinion 35 that meshes with the teeth of a large gear wheel 36, and which latter is fixed on crank shaft 14 in opening 11.

The operation of my improved briquette forming machine is as follows:

As power driven shaft 34 is operated, pinion 35 drives gear wheel 36 that is fixed on crank shaft 14 and the operation cross heads 16 carried by the cranks 15, in yokes 17 impart reciprocatory movement to said yokes and the plungers 18. Inasmuch as the cranks 15 are disposed 90° apart, the four plungers will operate in succession and each plunger will make one compression stroke during each complete revolution of the crank shaft. For this reason, there will be only one plunger in action at a time and this will minimize and likewise equalize the stresses and strains produced within the machine while the same is in operation.

On the rearward stroke of each plunger 18, the corresponding material feeding plunger 27 will be drawn upward by its piston in the corresponding cylinder 28, thereby permitting sawdust or the like to feed downwardly through chute 32 into chamber 19, and immediately after said chamber 19 is filled with the briquetting material and before the corresponding plunger starts forward to compress the material, feeding plunger 27 is moved downwardly into position so that its concave under surface 28 forms a wall for the upper portion of chamber 19. The corresponding plunger 18 now moves forwardly through chamber 19 beneath feeding plunger 27 and the material in front of said plunger 18 will be compressed into a short cylindrical body within the corresponding forming die 20.

Inasmuch as the tubular member 22 that receives the formed briquettes from the forming die 20 is of considerable length, a number of formed briquettes will always occupy said tubular member and these briquettes in effect, constitute a plug against which the last formed briquette is pressed as the plunger 18 moves through chamber 19 toward the forming die.

On the succeeding rearward stroke of the plunger 18, the feeding plunger 27 is elevated as hereinbefore described, and a fresh charge of material will enter chamber 19 from the lower end of the chute 32.

Thus it will be seen that I have provided in a relatively simple compact, strong and durable structure, means for forming fuel briquettes from sawdust and like comminuted vegetable material and for forcing said briquettes into tubular holders in which they may be baked for the purpose of driving off certain volatile matter and also for the purpose of charring the bodies of the briquettes either partially or entirely.

The frame of my improved briquette machine is made especially strong and substantial in order to adequately withstand the severe strains and stresses that are developed while the machine is in operation, and particularly while the briquette-forming plungers are imparting highest pressures.

It will be readily understood that minor changes in the size, form and construction of the various parts of my improved briquette machine may be made and substituted for those herein shown and described without departing from the spirit of the invention, the scope of which is set forth in the appended claims.

I claim as my invention:

1. In a briquette machine, a plurality of forming dies, a plurality of material feeding chambers communicating with said dies, plungers in said chamber, a plurality of tubular holders adjacent each of said forming dies adapted to register therewith, a plurality of plungers fitting said forming dies, means for reciprocating said plungers in succession in said forming dies and means for aligning one of said tubular holders with one of said forming dies during the movement of said plunger therein.

2. In a briquette machine, a plurality of forming dies, fluid actuated means for feeding finely comminuted material into said dies, plungers adapted to engage said forming dies, a plurality of briquette holding tubes adjacent each of said forming dies adapted to register therewith and means for reciprocating said plungers successively in said forming dies and registering briquette holding tubes.

In testimony whereof I affix my signature.

WILLIAM C. CARPENTER.